(12) United States Patent
Huck et al.

(10) Patent No.: US 7,728,472 B2
(45) Date of Patent: Jun. 1, 2010

(54) TRANSMISSION DRIVE UNIT WITH A PLUG-IN ELECTRONICS MODULE

(75) Inventors: Thomas Huck, Rheinmuenster (DE); Tarek Mili, Karlsruhe (DE); Lars-Dirk Anding, Nagold (DE)

(73) Assignee: Robert Bosch GmbH, Stuttgart (DE)

( * ) Notice: Subject to any disclaimer, the term of this patent is extended or adjusted under 35 U.S.C. 154(b) by 283 days.

(21) Appl. No.: 12/066,524

(22) PCT Filed: Sep. 21, 2006

(86) PCT No.: PCT/EP2006/066591

§ 371 (c)(1),
(2), (4) Date: Mar. 12, 2008

(87) PCT Pub. No.: WO2007/054395

PCT Pub. Date: May 18, 2007

(65) Prior Publication Data

US 2008/0252159 A1   Oct. 16, 2008

(30) Foreign Application Priority Data

Nov. 8, 2005 (DE) .................. 10 2005 053 535

(51) Int. Cl.
*H02K 11/00* (2006.01)
(52) U.S. Cl. .................. 310/71; 310/75 R; 310/68 R
(58) Field of Classification Search .................. 310/71, 310/68, 75 R, 68 R, 89
See application file for complete search history.

(56) References Cited

U.S. PATENT DOCUMENTS

| 4,161,994 | A | * | 7/1979 | Collonia | 180/179 |
|---|---|---|---|---|---|
| 4,523,564 | A | * | 6/1985 | Sturdy | 123/361 |
| 5,245,258 | A | * | 9/1993 | Becker et al. | 318/266 |
| 5,984,695 | A | | 11/1999 | Riehl et al. | |
| 6,107,713 | A | | 8/2000 | Huelsmann et al. | |
| 6,279,535 | B1 | * | 8/2001 | Matsusaka | 123/399 |
| 6,407,543 | B1 | * | 6/2002 | Hagio et al. | 324/207.25 |
| 6,707,183 | B2 | | 3/2004 | Breynaert et al. | |
| 6,725,833 | B1 | * | 4/2004 | Irihune et al. | 123/399 |
| 6,998,741 | B2 | | 2/2006 | Breynaert et al. | |
| 7,170,208 | B2 | | 1/2007 | Breynaert et al. | |
| 2003/0001448 | A1 | * | 1/2003 | Kaeufl et al. | 310/91 |

(Continued)

FOREIGN PATENT DOCUMENTS

DE        299 11 221        10/1999

(Continued)

*Primary Examiner*—Thanh Lam
(74) *Attorney, Agent, or Firm*—Michael J. Striker

(57) ABSTRACT

Gear drive unit (10) with a plug-in electronics module (44), in particular for adjusting moving parts in a motor vehicle, comprising an electric motor (12) which has an armature shaft (18), a lower housing shell (14) and an upper housing shell (16), which housing shells can be joined together radially with respect to the armature shaft (18) at a separating plane (32) and enclose the electric motor (12), wherein an electronics interface (42) for receiving a plug-in electronics module (44) is arranged on the lower housing shell (14), and the electronics interface (42) has a sealing plane (54) between an outer face (40) of the lower housing shell (14) and the plug-in electronics module (44), this sealing plane been arranged at least approximately parallel to the separating plane (34).

15 Claims, 3 Drawing Sheets

U.S. PATENT DOCUMENTS

| | | | |
|---|---|---|---|
| 2004/0177832 A1* | 9/2004 | Irihune et al. | 123/399 |
| 2005/0109315 A1* | 5/2005 | Kamimura et al. | 123/399 |
| 2006/0113860 A1 | 6/2006 | Breynaert et al. | |
| 2007/0018517 A1* | 1/2007 | Huck et al. | 310/71 |
| 2009/0102299 A1* | 4/2009 | Lampert et al. | 310/71 |

FOREIGN PATENT DOCUMENTS

| | | |
|---|---|---|
| DE | 198 19 996 | 11/1999 |
| DE | 198 39 333 | 1/2000 |
| DE | 103 52 240 | 2/2005 |
| EP | 0 911 949 | 4/1999 |
| EP | 1 146 318 | 10/2001 |

* cited by examiner

TRANSMISSION DRIVE UNIT WITH A PLUG-IN ELECTRONICS MODULE

RELATED ART

The present invention relates to a transmission drive unit with a plug-in electronics module, in particular for adjusting movable parts in a motor vehicle, with a lower housing shell and an upper housing shell, according to the preamble of the independent claims.

Publication DE 10352240 A1 makes known an electric motor, the housing of which is composed of two half shells, which are installable radially to the armature shaft. Two permanent magnets—which are magnetically coupled with each other via two separated magnetic return parts—are located around the rotor in the housing. The magnetic return elements are clamped together when the two housing parts are installed radially, thereby fixing them in position in three dimensions. An electronics module is located inside the housing, which is connected with a connecting plug integrally formed with the housing. With a device of this type, the electronics module may not be manufactured separately or varied, thereby greatly limiting flexibility with regard for special customer requests.

DISCLOSURE OF THE INVENTION

The inventive transmission drive unit and the plug-in electronics module with the characterizing features of the independent claims have the advantage that, by integrally forming an electronics interface on the lower housing shell with a circumferential wall that forms a flat sealing surface, a very compact drive unit is ensured that has a geometry that is very simple and therefore sealed reliably. The lower housing shell and the electronics module may be manufactured very favorably via injection molding, using tools without plungers. The electronics module may therefore be developed and manufactured separately and still be connected to the transmission drive unit in a very cost-favorable manner.

Advantageous refinements and improvements of the features indicated in the independent claims are made possible by the measures listed in the subclaims. The stability of the lower housing shell is therefore not compromised by the opening required for insertion. Instead, it is provided only with a small opening for a Hall sensor or a Hall sensor integrated in a microcontroller. Alternatively, the Hall sensors may also register the signals from the annular magnet through a housing without an opening, through a housing wall. The insertion module itself is an easily manufactured "shell part". The seal between the plug-in electronics module and the lower motor shell lies in a plane and performs its sealing function easily and reliably. Screw-type or locking elements may be used for attachment. Plug stability may be realized using simple guide contours between the plug-in electronics module and the lower housing shell. The position of the printed circuit board provides easy access to the printed circuit board for the plastic housing shell of the plug-in electronics module. The pins may be contacted with the printed circuit board using via soldering or pressing-in. The housing of the plug-in electronics and the printed circuit board are scalable, i.e., larger printed circuit board surfaces may be realized. Adequate installation space is provided for insertion of a microcontroller with integrated Hall sensors, since it is not necessary to insert a finger of a printed circuit board between the annular magnet and the wall of the transmission housing.

DRAWING

Various exemplary embodiments of a device according to the present invention are presented in the drawing and are described in greater detail in the description below.

DESCRIPTION OF THE EXEMPLARY EMBODIMENTS

Figure 1:
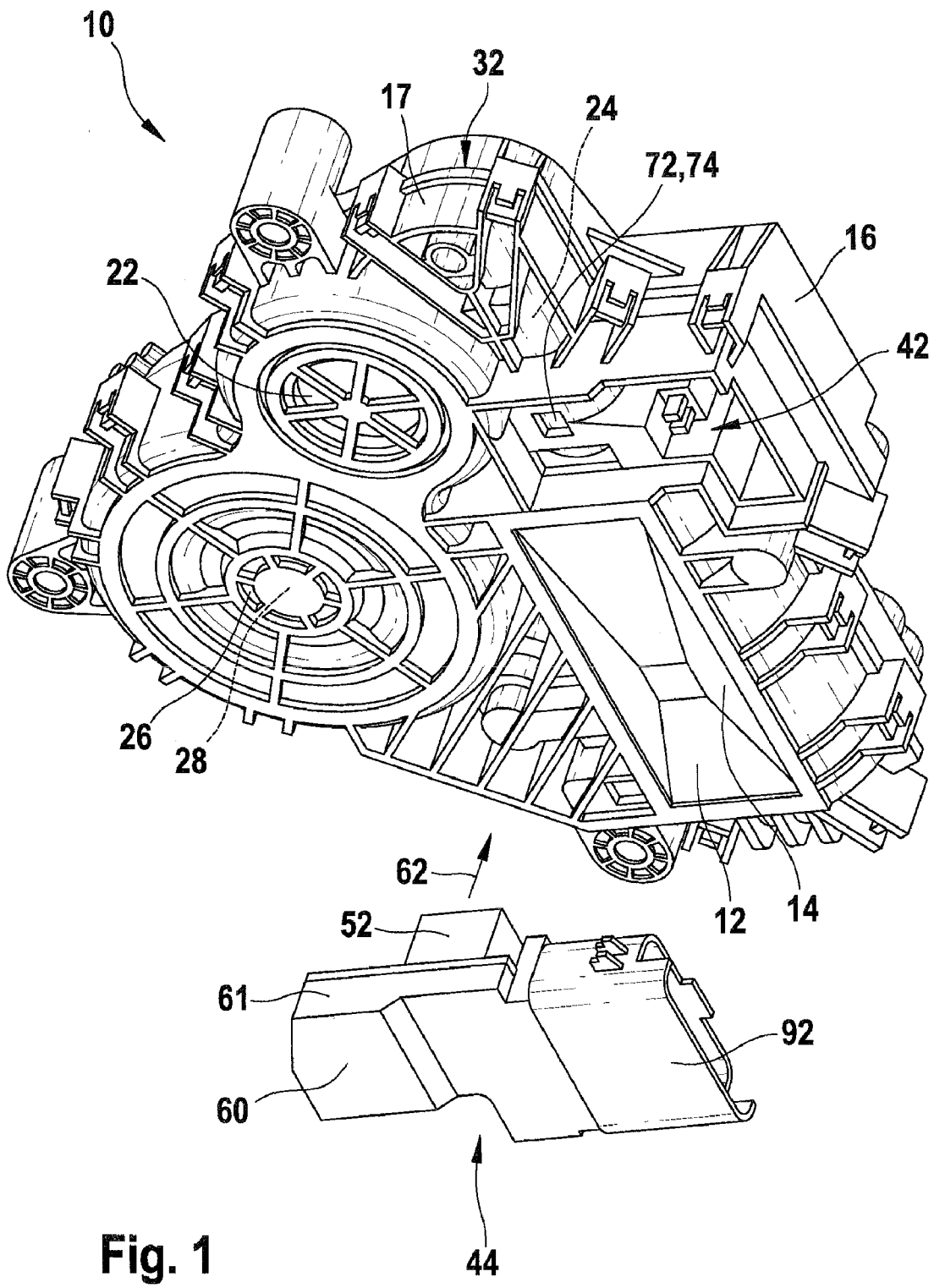
FIG. 1 shows an inventive transmission drive unit with a plug-in electronics module.

FIG. 1 shows a transmission drive unit 10, in particular for a power window, which includes an electric motor 12, which is accommodated in a lower housing shell 14 and an upper housing shell 16. Electric motor 12 includes an armature shaft 16, which extends into a transmission housing 17, which is also formed by two housing shells 14 and 16. A worm wheel 22 is also located between housing shells 14, 16, and engages with a worm 24 mounted on armature shaft 18. Worm gear 24 is coupled via a transmission gear 26 and a further transmission stage with an output element 28 that provides a drive torque for adjusting a movable part. Both housing shells 14 and 16, which enclose electric motor 12 via their inner sides 30, are joined at a parting plane 32 that extends essentially parallel to armature shaft 18. For example, a circumferential sealing edge 34 is located on lower shell 24, against which a seal 36 integrally formed with upper shell 26 is pressed. Locking elements 38 are provided on both housing shells 14, 16 for locking them together and sealing housing 14, 16 in a waterproof manner. An electronics interface 42 is integrally formed on an outer side 40 of lower housing shell 14, into which a plug-in electronics module 44 may be inserted. Drive unit 10 and electronics module 44 may be manufactured and tested for proper functioning separately. Electronics module 44 may be adapted to the requirements of the specific application (e.g., with or without finger protection).

Figure 2:
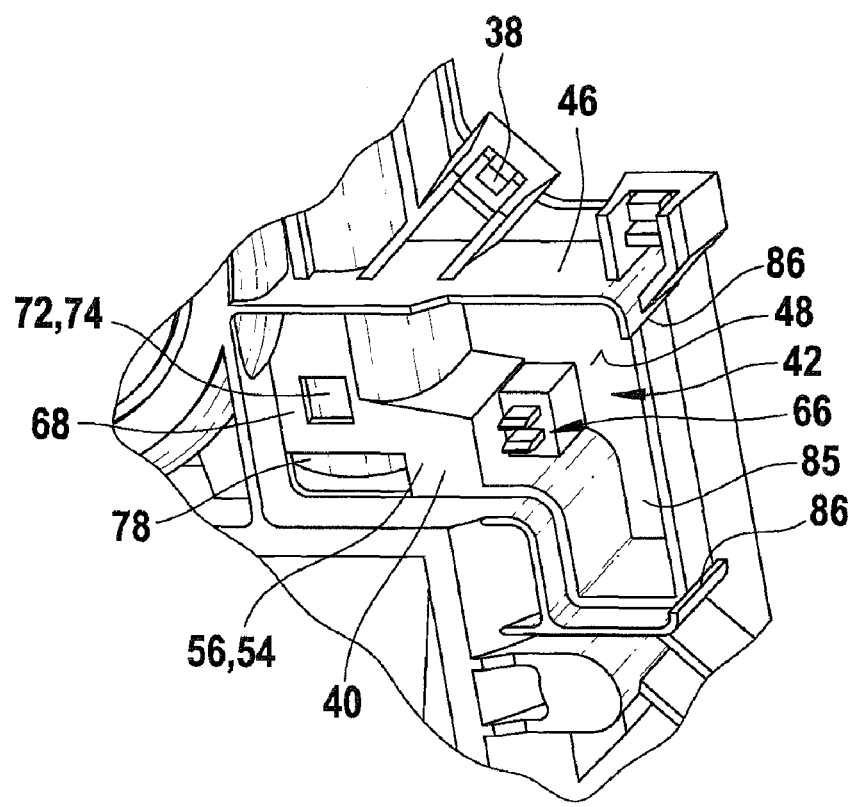
FIG. 2 shows an enlarged section of the interface in FIG. 1.

Interface 42 on outer side 40 of lower housing shell 14 is shown enlarged in FIG. 2. Interface 42 includes a circumferential wall 46, which, together with outer side 40 serving as base surface 48, forms installation space 50 for electronic components 52 of electronics insertion module 44. Interface 42 includes a sealing plane 54 for electronics module 44 and extends nearly parallel with parting plane 32. A sealing surface 56 of interface 42 extends within and/or along circumferential wall 46. A corresponding circumferential seal 58 is located on plug-in module 44, which seals off shell-type housing 60 of the electronics module from installation space 50 in a waterproof manner. Installation space 50 extends in radial direction 62—which corresponds to insertion direction 62—beyond armature shaft 18, thereby enabling even larger electronic components 52 such as a relay 64 to be accommodated in installation space 50. For electrically contacting electric motor 12, motor current contacts 66 are guided inside interface 42 through wall 68 of lower housing shell 14 and engage in counter-contacts 70 located on electronics module 44 when electronics module 44 is plugged in. To measure the rotational speed of drive 10, a recess 72 is formed in interface 42, into which rotational speed measuring devices 73 of plug-in electronics module 44 may be inserted. For example, recess 72 is designed as opening 74 in wall 68, thereby creating direct access to an annular magnet 76 located on armature shaft 18.

Figure 3:
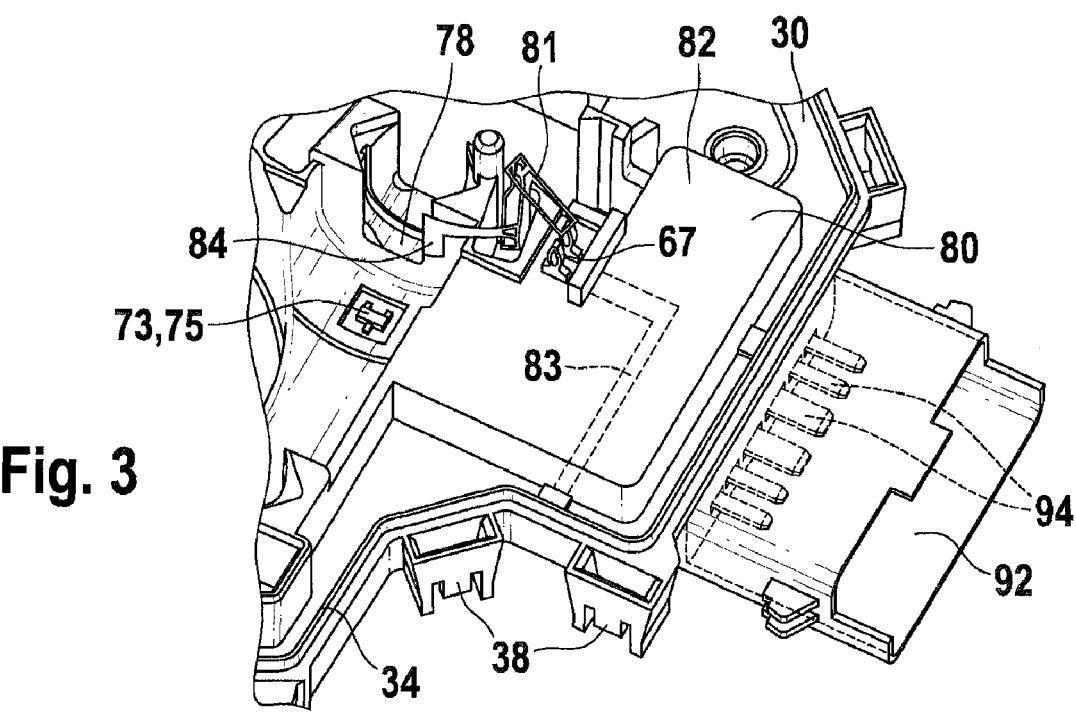
FIG. 3 shows a further view of the exemplary embodiment in FIG. 1.

In FIG. 3, opening 74 is shown from inner side 30 of lower housing shell 14. To provide a better view, electric motor 12 with armature shaft 18 is not shown. Opening 76 is located directly axially adjacent to a bearing point 78, e.g., a receptacle 78 for a calotte bearing of armature shaft 18. Rotational speed measuring device 73 of plugged-in electronics module 44 extends through opening 74. The size of opening 74 not significantly larger than inserted rotational speed sensor 73, to ensure the mechanical stability of housing shell 14. In this case, rotational speed sensor 73 is designed as a Hall sensor 75, in particular as a double Hall sensor 75. In a further embodiment, Hall sensor(s) 75 may also be integrated as ASIC components in a microprocessor, in which case preferably only sensor system part 73 extends through opening 74 and/or into a recess 72 with a wall between annular magnet 76 and rotational speed sensor 73. A substrate 80 for electrical connections 81 is located on inner side 30 and opposite to interface 42. Substrate 80 includes, e.g., a pressed screen 83 enclosed with a plastic body 82 applied via injection molding. Inner connecting contacts 67 of motor bushing 66 are also located on substrate 80. Connecting contacts 67 are also connected with brushes 84 of electric motor 12. Locking elements 38, which are integrally formed along sealing edge 34 of housing shell 14, are also shown clearly in FIG. 3.

Figure 4:
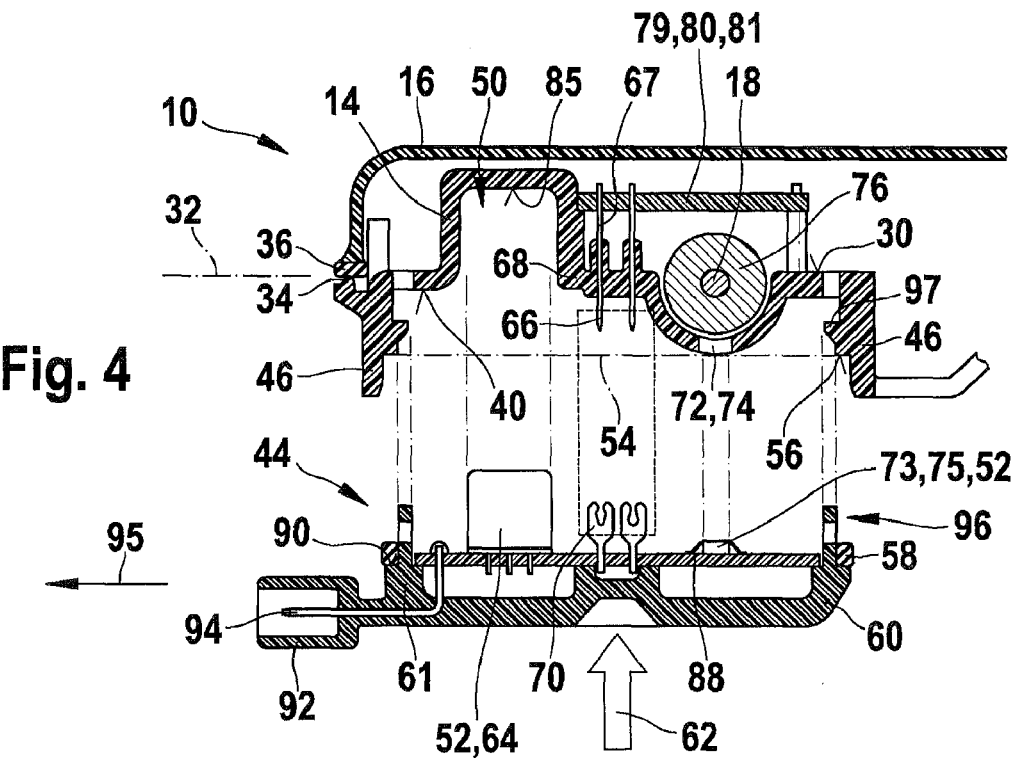
FIG. 4 shows a further exemplary embodiment with the plug-in electronics module, in a cross-sectional view.

A schematic cross-sectional view of a further embodiment of a drive unit 10 is shown in FIG. 4. Armature shaft 18 is located between lower housing shell 14 and upper housing shell 16. Parting plane 32 and seal 36 around nearly the entire circumference are located in the same plane. In the region of interface 44, lower housing shell 14 forms a recess 85 toward upper housing shell 16, in order to create sufficient installation space 50 for large electronic components 52. A printed circuit board 79, as substrate 80, is located on inner side 30. Printed circuit board 79 is connected with motor current contacts 66 guided through wall 68 and establishes electrical connections 81 with brushes 84. Plug-in electronics module 44 includes a shell-shaped housing 60 with a circumferential side wall 61, in which a printed circuit board 88 is installed, as the carrier s for electronics components 52. Counter-contacts 70 are located on printed circuit board 88 in such a manner that they are connected directly with motor bushings 66 when electronics module 44 is inserted in plug-in direction 62. Simultaneously, rotational speed sensor 73 is slid into recess 72 during insertion, so that it is located directly opposite to the circumference of annular magnet 76. Further electronics components, such as relay 52, extend into recess 85 of lower housing shell 14. During insertion, the electronics module is guided with its circumferential side wall 61 inside circumferential wall 46 of interface 42 until side wall 61 bears with its end face 90 against circumferential sealing surface 56 of sealing plane 54. A seal 58 is located between end face 90 and sealing surface 56. Seal 58 is preferably injection molded on side wall 61 and seals off installation space 50 against water and dirt. Electronics module 44 includes a connecting plug 92 with plug pins 94, which are connected with printed circuit board 88 and extend in tangential direction 95 toward armature shaft 18. To install electronics module 44, latch hooks 96 are formed thereon, into which snap-in hooks 97 located on interface 42 engage.

Figure 5:
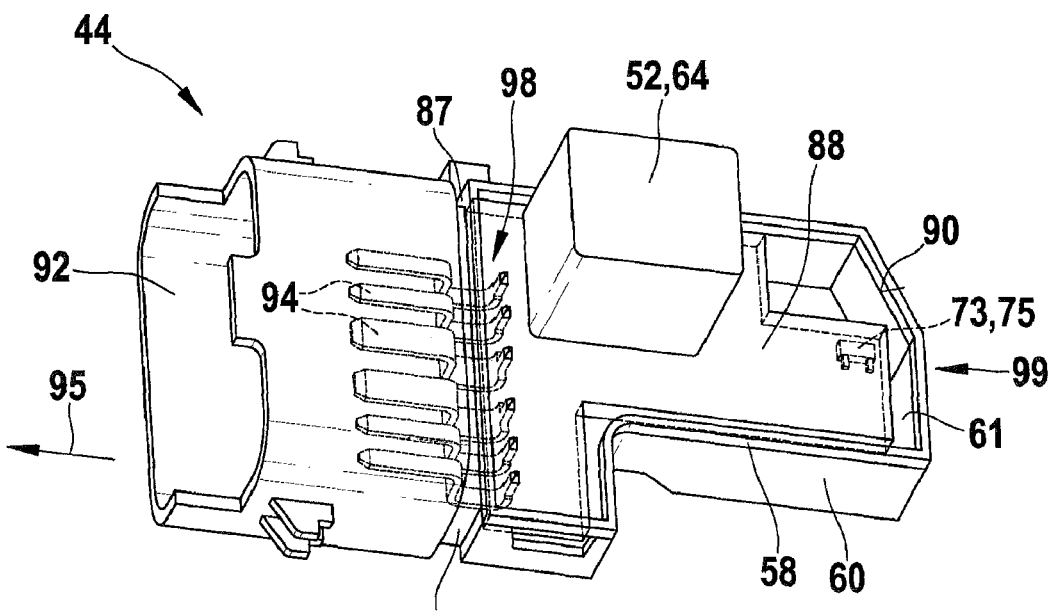
FIG. 5 shows a top view of the insertion module in FIG. 1.

Plug-in electronics module 44 in FIG. 1 is also shown in FIG. 5, in an enlarged view. Connecting plug 92 is located on side wall 61, which is designed wider in region 98 of connecting plug 92 than on opposite side 99 of side wall 61. Printed circuit board 88 is therefore also designed wider on side 98 than on side 99. In region 98 between connecting plug 92 and side wall 61, electronics module 44 includes recesses 87, which engage in related sections 86 of circumferential wall 46 of interface 44 in a form-fit manner, for support.

It should be noted that, with regard for the exemplary embodiments presented in the figures and the description, many different combinations of the individual features are possible. For example, the specific configuration and design of circumferential walls 46 and 61 may be varied. Instead of locking elements 96, 97, other connecting means, e.g., screws, may be used. The inventive transmission drive unit is preferably used for power windows or to adjust other movable parts in a motor vehicle. The housing may include further housing parts in addition to two shell-shaped housing parts 14, 16.

What is claimed is:

1. A transmission drive unit (10), in particular for adjusting movable parts in a motor vehicle, with an electric motor (12) with an armature shaft (18), and a lower housing shell (14) and an upper housing shell (16), which are joinable radially to the armature shaft (18) at a parting plane (32), and which enclose the electric motor (12),
wherein
an electronics interface (42) for receiving a plug-in electronics module (44) is located on the lower housing shell (14), and the electronics interface (42) includes a sealing plane (54) between an outer side (40) of the lower housing shell (14) and the plug-in electronics module (44), which is located at least approximately parallel to the parting plane (34).

2. The transmission drive unit (10) as recited in claim 1, wherein
an axial sealing surface (56), which is circumferential relative to the plug-in direction (62) of the plug-in electronics module (44), is located on the sealing plane (54).

3. The transmission drive unit (10) as recited in claim 1, wherein
the electronics interface (42) includes a recess (72)—an opening (74), in particular—in the lower housing shell (14) opposite to the armature shaft (18), into which a rotational speed sensor (73)—in particular at least one Hall sensor (75)—is insertable.

4. The transmission drive unit (10) as recited in claim 1, wherein
the recess (72) is located axially directly next to a bearing point (78) of the armature shaft (18), opposite to an annular magnet (76) mounted thereon.

5. The transmission drive unit (10) as recited in claim 1, wherein,
at the electronics interface (42), electrical motor current contacts (66) are guided through the housing wall (68) of the lower housing shell (14), being injected therein in particular.

6. The transmission drive unit (10) as recited in claim 1, wherein
a carrier substrate (80, 79, 82) for electrical connections (81, 67) is located in the region of the electronics interface (42) on an underside (30) of the lower housing shell (14), the electrical connections (81, 67) connecting the motor current contacts (66) with brushes (84) of the electric motor (12) in particular.

7. The transmission drive unit (10) as recited in claim 1, wherein
a circumferential wall (46) is located at the electronics interface (42), which extends essentially in the plug-in direction (62) and forms an installation space (50) that is open toward the plug-in module (44), the base surface (48) of which is formed by the outside (40) of the lower housing shell (14).

8. The transmission drive unit (10) as recited in claim 1, wherein,
the electronics interface (42) includes locking means (97) for latching in place with counter-locking means (96) on the insertion module (44).

9. The transmission drive unit (10) as recited in claim 1, wherein
a worm wheel (22) is located inside the lower and upper housing shells (14, 16); worm wheel (22) engages with a worm (24) on the armature shaft (18) and is operatively connected with a further transmission gear (26), which includes an output element (28) for adjusting a movable part.

10. A plug-in electronics module (44) for use with a transmission drive unit (10) as recited in claim 1,
wherein
the plug-in module (44) includes a seal (58)—which is made of a thermoplastic elastomer, in particular—which may interact, as an axial seal (58), with the sealing surface (56) that is parallel with the parting plane (34) such that the plug-in electronics module (44) is sealed in a water-tight manner.

11. The plug-in electronics module (44) as recited in claim 10, characterized by an electrical connecting plug (92), the plug pins (94) of which extend tangentially to the armature shaft (18) and transversely to the plug-in direction (62).

12. The plug-in electronics module (44) as recited in claim 11,
wherein
the plug pins (94) are located on a side wall (61, 98) of the plug-in electronics module (44), and a side wall (61, 98) extends in the plug-in direction (62) and is designed wider in the region (98) with the connecting plug (92) than the side wall (61, 99) opposite thereto.

13. The plug-in electronics module (44) as recited in claim 10, characterized by a printed circuit board (88), which extends in a plane (54) that is transverse to the plug-in direction (62), and on the side of which facing the armature shaft (18) parts, at the least, of a rotational speed measuring device (73)—a Hall sensor system (75), in particular—are located.

14. The plug-in electronics module (44) as recited in claim 10,
wherein
electronic components (52, 75)—a relay (64), in particular—are located on the printed circuit board (88) and extend—in the installed state—radially into the installation space (50), beyond the armature shaft (18), into a recess (85) in the lower housing shell (14).

15. A system for electrically adjusting movable parts in a motor vehicle, window panes in particular, with which a transmission drive unit (10) as recited in one of the claims 1 through 9 is combined with a plug-in electronics module (44) as recited in claim 10.

* * * * *